United States Patent
Gerszberg et al.

(10) Patent No.: US 6,292,210 B1
(45) Date of Patent: Sep. 18, 2001

(54) INTEGRATED REMOTE CONTROL AND PHONE USER INTERFACE

(75) Inventors: Irwin Gerszberg, Kendall Park; Jeffrey S. Martin, Dover; Hopeton S. Walker, Haledon; Edward L. Wallace, South Orange, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/001,420

(22) Filed: Dec. 31, 1997

(51) Int. Cl.$^7$ ....................................................... H04N 7/14
(52) U.S. Cl. ................................... 348/14.01; 348/14.03; 348/14.05
(58) Field of Search .................................. 348/7, 10, 12, 348/14, 15, 564, 734; 455/6.3

(56) References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,725,694 | 2/1988 | Auer et al. . |
| 4,916,441 | 4/1990 | Gombrich . |
| 5,014,267 | 5/1991 | Tompkins et al. . |
| 5,138,649 * | 8/1992 | Krisbergh et al. ..................... 348/14 |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,559,549 * | 9/1996 | Hendricks et al. ...................... 348/6 |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,619,684 | 4/1997 | Goodwin et al. . |
| 5,621,456 * | 4/1997 | Florin et al. ............................. 348/7 |
| 5,644,628 | 7/1997 | Schwarzer et al. . |
| 5,671,267 | 9/1997 | August et al. . |
| 5,682,195 | 10/1997 | Hendricks et al. . |
| 5,684,918 | 11/1997 | Abecassis . |
| 5,724,106 * | 3/1998 | Autry et al. ........................... 348/734 |
| 5,745,710 * | 4/1998 | Clanton, III et al. .................... 348/7 |
| 5,812,683 * | 9/1998 | Parker et al. ............................ 381/74 |
| 5,835,570 * | 11/1998 | Wattenbarger ........................... 379/67 |
| 5,838,775 * | 11/1998 | Montalbano ....................... 379/93.23 |
| 5,963,245 * | 9/1997 | McDonald .............................. 348/14 |
| 5,999,207 * | 12/1999 | Rodriguez et al. ..................... 348/14 |
| 6,047,327 * | 4/2000 | Tso et al. ............................. 709/232 |

FOREIGN PATENT DOCUMENTS 7-184174 * 7/1995 (JP) ................................. H04N/7/14

OTHER PUBLICATIONS

Hendricks et al.; Network Manager for Cable Television System Headends; WO 95/15658, Jun. 1995.*

* cited by examiner

Primary Examiner—Curtis Kuntz
Assistant Examiner—Melur Ramakrishnaiah

(57) ABSTRACT

A remote control handset for cordless communication with a video controller enables enhanced video control and telephonic communication through the handset in an integrated communication network. Interface features on an integrated remote control and phone handset and in graphical screens displayed on the video appliance to facilitate user control of viewing and telephonic functions available in the aforementioned architecture. The user interface comprises controls or push buttons on a control panel incorporated into the handset. The user interface also comprises graphical screens which may be configured by the user to appear as a picture-in-picture with a video broadcast program on the video appliance, or as a full screen on the video appliance. The invention also provides speed dial features in which a number displayed on an advertisement on the video appliance may be dialed by the user upon engagement of a single control button on the handset.

18 Claims, 9 Drawing Sheets

FIG. 6
FIG. 7
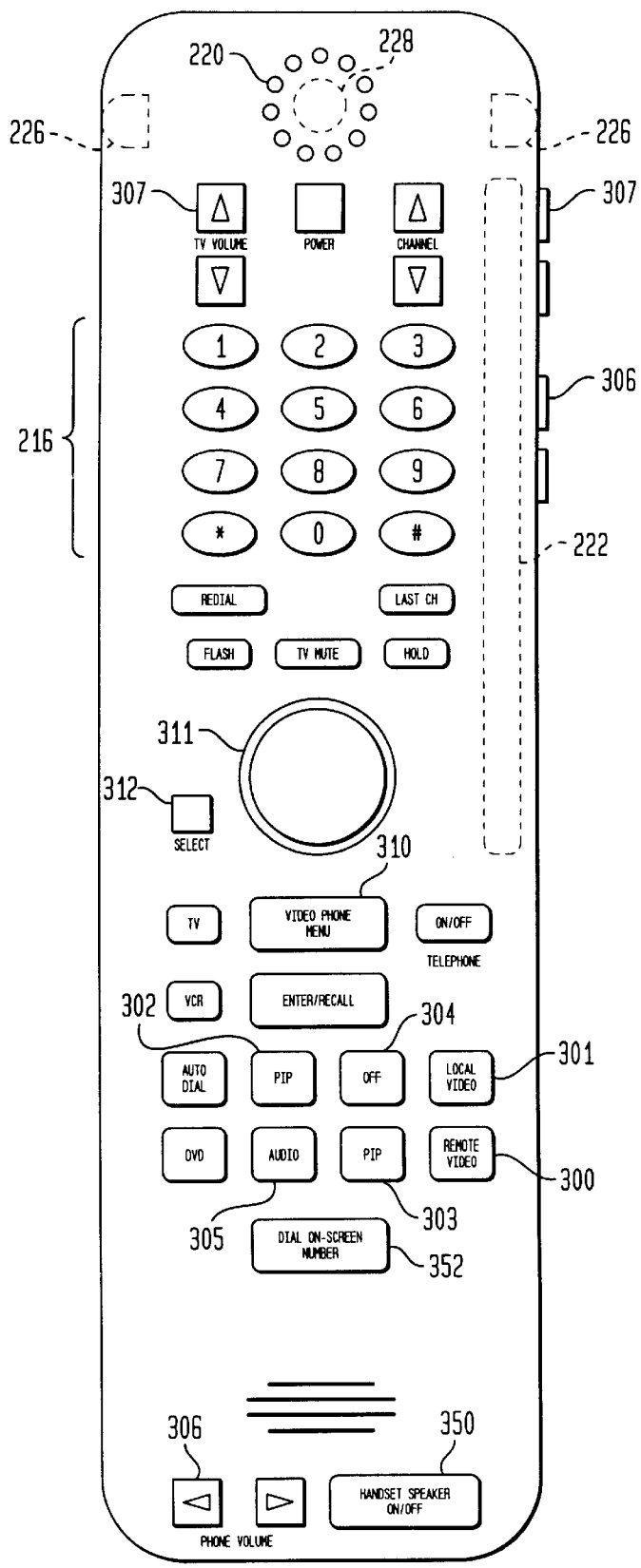
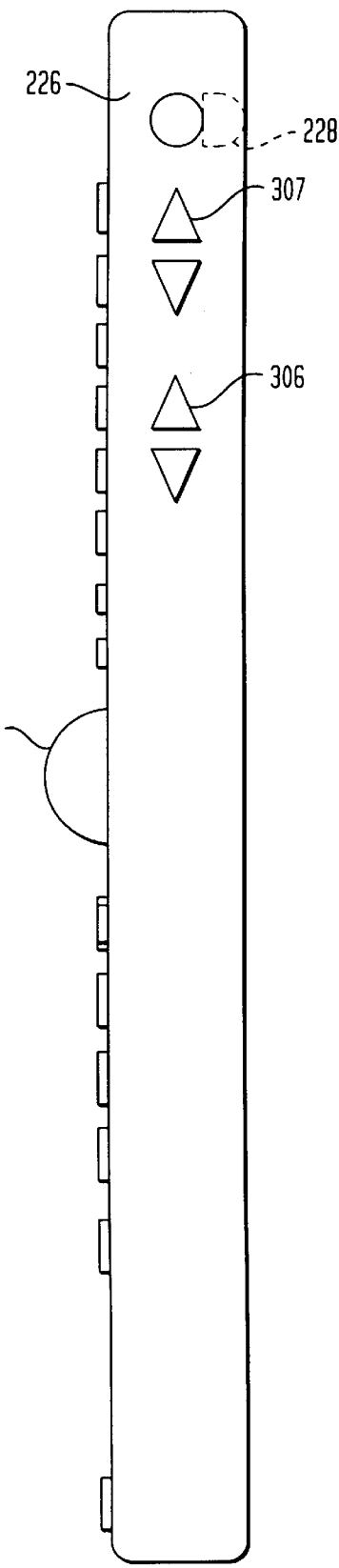

INTEGRATED REMOTE CONTROL AND PHONE USER INTERFACE

FIELD OF THE INVENTION

This invention relates to communication systems and, more particularly, to an interface for a communication system providing access to several audio, video and telephonic services on a network.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. One aspect of such desirable architecture, services and equipment would provide, among other functions, interactive video and telephone services. It would be desirable to provide such video services using a set-top device that would permit the desired system to interface with a conventional television set. It would also be desirable to provide an interface permitting ease of use of the services available through such an architecture.

Such a system would also ideally incorporate remote telephonic features such that telephone services could be provided through a portable wireless transceiver used within the residence or place of use and in close proximity to a base unit. Wireless telephones are, in general, known. Their use may be problematic, however, when they are employed in environments which also include separate remote control implements for televisions and other devices. For example, when a person who is viewing a television program receives a telephone call, he or she may need to locate the remote control and adjust the television parameters, i.e., volume, before answering the telephone. Such an exercise represents a challenge in device management where the wireless telephone and remote control are housed in separate units.

There is also a need to provide improved interfacing, ergonomics and power efficiency in handsets which may house telephonic devices. Typically, rather heavy and large power supplies must be provided in wireless telephone handsets in order to provide the necessary power. Often, operation of the telephone handset speaker to transform the caller's voice into an audible signal consumes the majority of the energy stored in the handset battery. The power requirements often result in short usage times between recharges and in rather heavy handset devices that are ergonomically cumbersome. It would therefore be desirable to provide a handset which is adaptable to a low power mode of operation in order to prolong the time between recharging and possibly permit smaller and lighter power supplies to be incorporated into their design.

Arrangements for interfacing with and integrating the functions of a telephone and a remote control for a television receiver are proposed in U.S. Pat. Nos. 4,456,925 and 5,671,267, the subject matter of both patents is incorporated herein by reference. However, these systems lack certain conveniences and other desirable features. This invention addresses a need for greater convenience, versatility and energy efficiency in an integrated, remote-controlled telephone and video receiver system.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides a handset integrating the functionality of a remote control for a set-top device and the functionality of a wireless telephone. The handset is provided with a loudspeaker for generating an audible signal corresponding to a caller's voice and an infrared (IR) or radio frequency (RF) transmitter for transmitting a signal corresponding to the caller's voice to the set-top device where it may be overlayed with the video program signal and output through the television speaker. The handset may be configured such that the handset speaker is turned off and the caller's voice is mixed at user-selectable levels with the audio portion of the video program and output through the television speaker. Bypassing of the handset speaker in this manner results in significant energy savings.

In accordance with one aspect of the invention, enhanced cordless control via an infrared link is provided by a handset having a user interface comprising user-engageable controls on the front face of the handset case for activating circuitry within the case to send infrared commands to a controller which responds to the handset, an infrared emitting diode on the top end of the case, and at least one additional infrared emitting diode on either side or on the rear face the case. All of the infrared emitting diodes emit the infrared commands, which are received by the controller from the diode which generally faces the controller.

In another aspect of the invention, cordless radio frequency communication with a controller in a computer-controlled local area communication network, which interconnects a plurality of devices for handling analog and/or digital voice and/or data, is effected by a remote control handset comprising a case, a user interface on the handset comprising user-engageable controls for interacting with the network, and a radio frequency antenna housed completely within the case for effecting a radio frequency link with the controller.

In a further aspect of the invention, enhanced integrated communication is afforded in a local area communication network by providing a remote control handset for cordless communication with a video controller to enable video control and telephonic communication through the handset via infrared and radio frequency links. The handset has a user interface on the front face of its case comprising user-engageable controls for activating circuitry within the case to send infrared commands to the video controller. A radio frequency antenna is carried by the case for voice communication with the video controller. A microphone is located on the front face near the bottom end, and a loudspeaker is located on the front face near the top end. A top-mounted infrared emitting diode emits the infrared commands which are received by the video controller when the top end of the handset is aimed substantially at the video controller. At least one side-mounted infrared emitting diode also emits the infrared commands, which are received by the video controller when the handset is used for telephonic communication with the loudspeaker held adjacent the user's ear and the user substantially faces the video receiver. An infrared emitting diode on each side of the case, and one mounted on the rear, insure that the infrared commands are received by the video controller when the user holds the loudspeaker to either ear and substantially faces the video receiver, or turns his head. Side-mounted volume controls also may be provided so that the user easily can separately adjust video and telephone volume with the handset held to his ear.

In yet a further aspect of the invention there are provided interface features on an integrated remote control and phone handset and in graphical screens displayed on the video appliance to facilitate user control of viewing and telephonic functions available in the aforementioned architecture. The user interface comprises controls or push buttons on a control panel incorporated into the handset. The user interface also comprises graphical screens which may be configured by the user to appear as a picture-in-picture with a video broadcast program on the video appliance, or as a full screen on the video appliance. The invention also provides speed dial features in which a number displayed on an advertisement on the video appliance may be dialed by the user upon engagement of a single control button on the handset.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 6 is a front view of a handset according to an embodiment of the present invention.

FIG. 7 is an elevational view of the right side of the handset of FIG. 6.

DETAILED DESCRIPTION OF PREFERRED EMBODIMENTS

Figure 1:
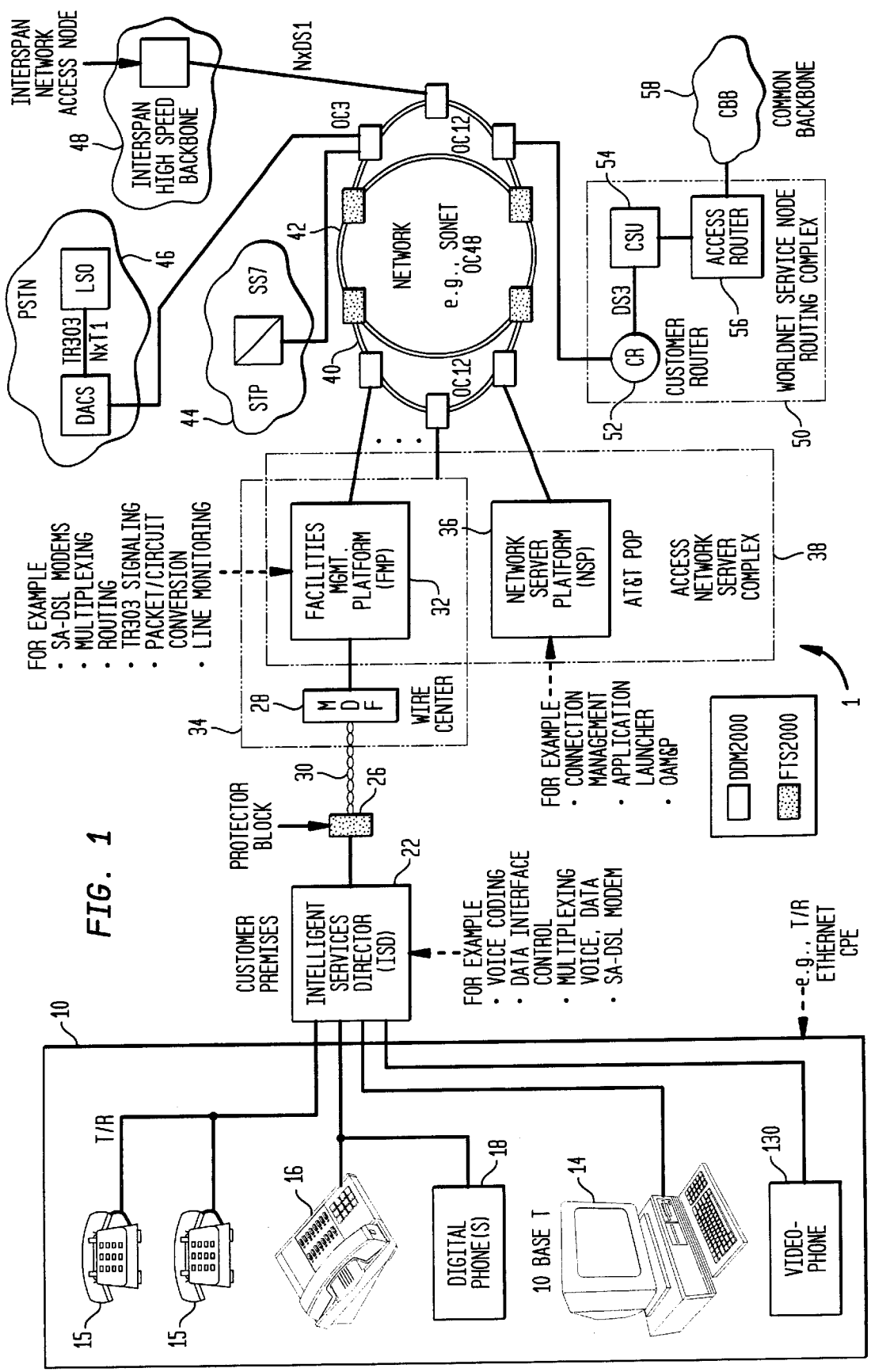
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programing of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment.

Figure 2:
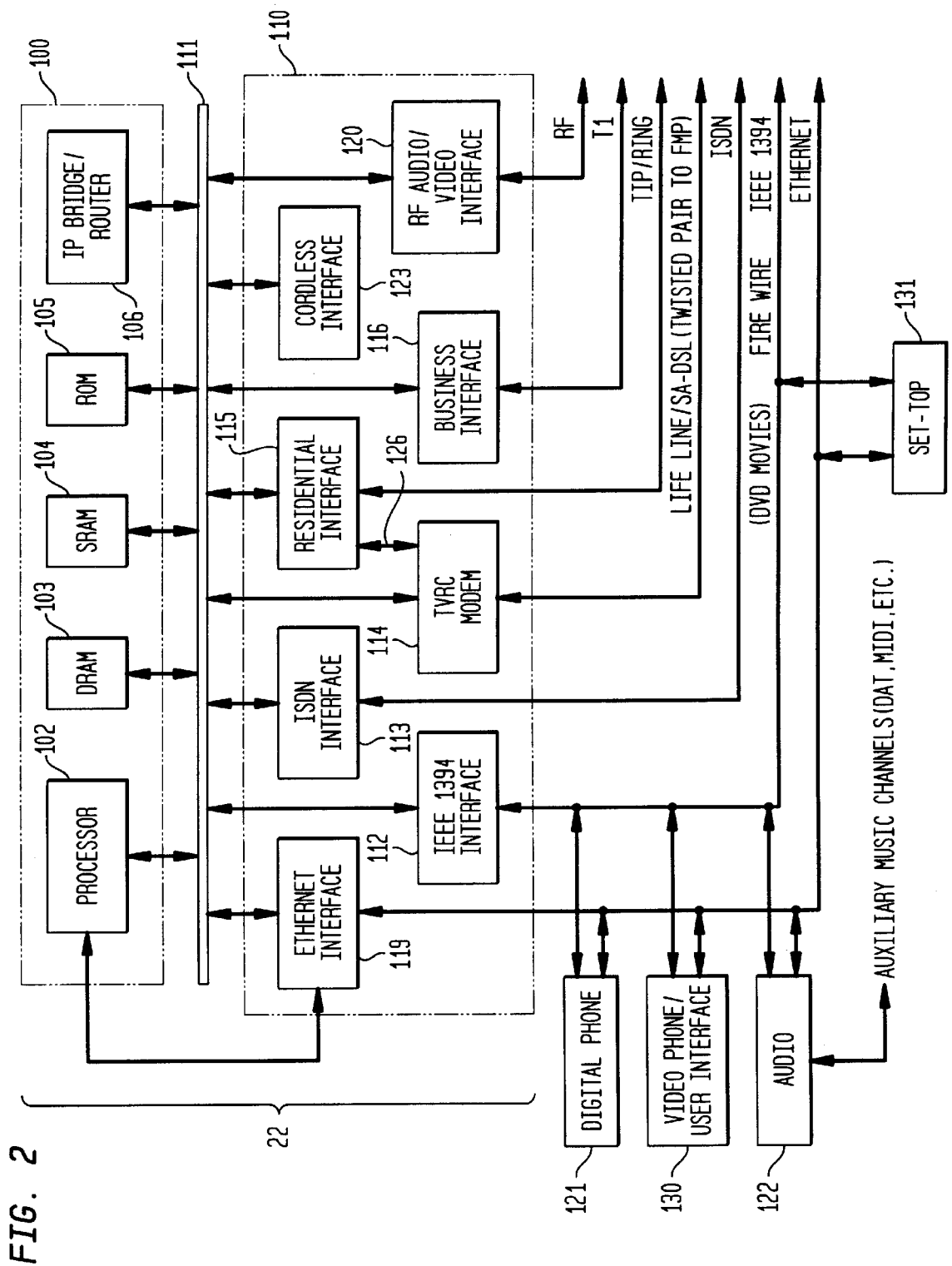
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., for 28.8 kbs data, 56 kbs data, or ISDN), an IEEE 1394 "fire wire" interface 112 (e.g., for a digital videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone / user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD 22 may be configured as an IP proxy server such that each of the devices connected to the server utilizes transmission control protocol / internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being pre-configured to select the desired video clip/ movie in real time for immediate viewing and/or into storage for later viewing.

Figure 3A:
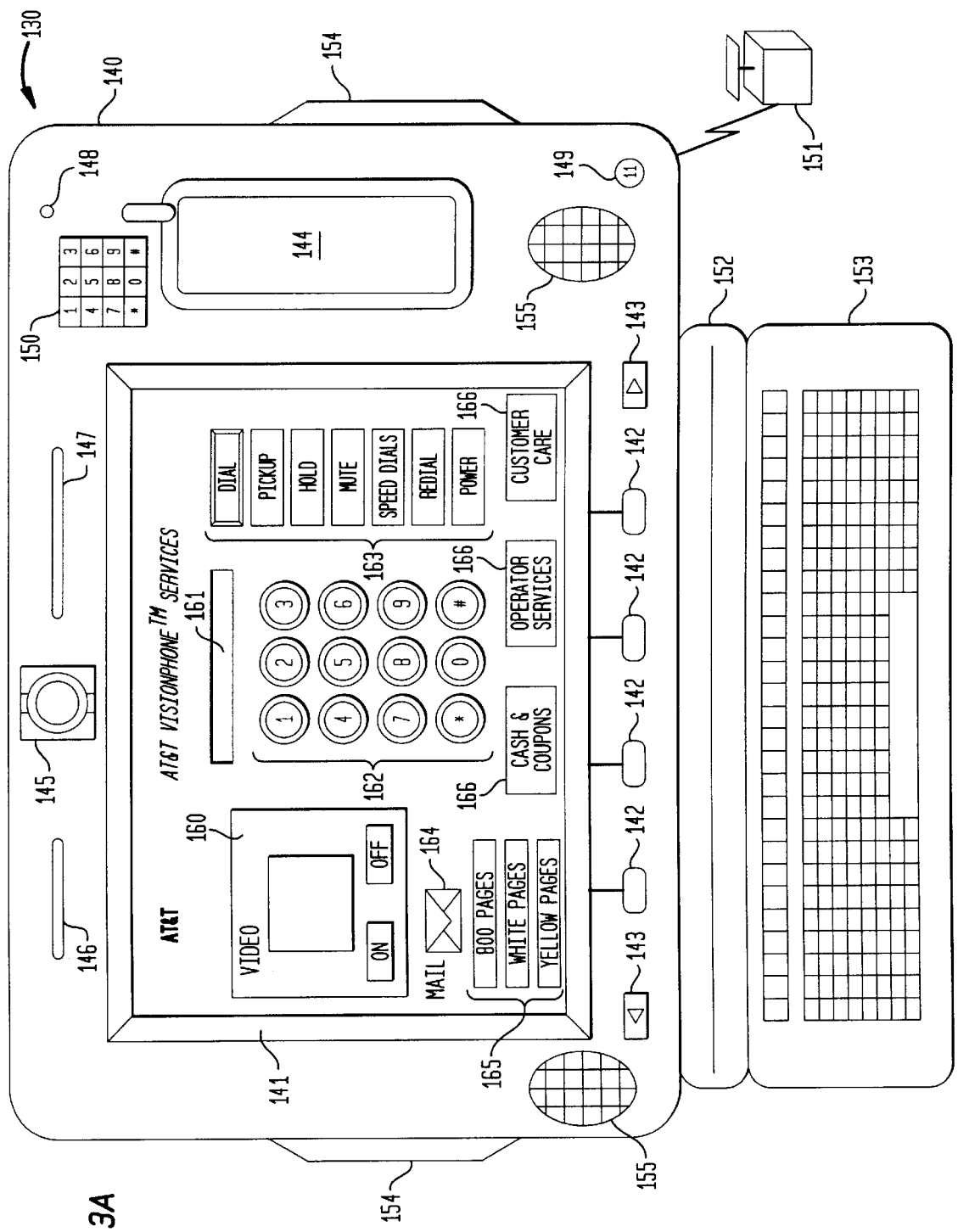
FIGS. 3A and 3B illustrate an embodiment of a video phone consistent with the architecture shown in FIG. 1.
Figure 3B:
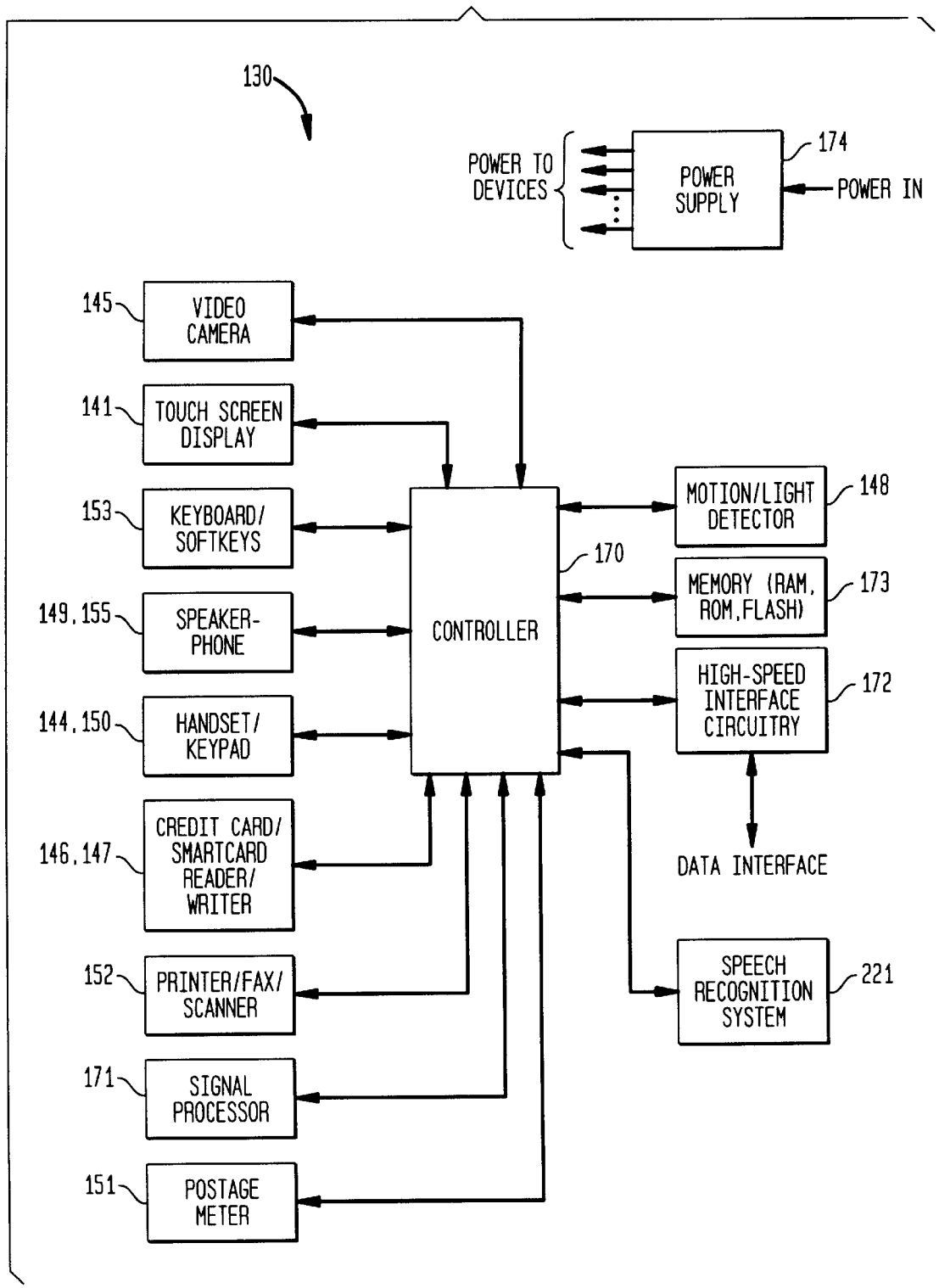

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key maybe displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
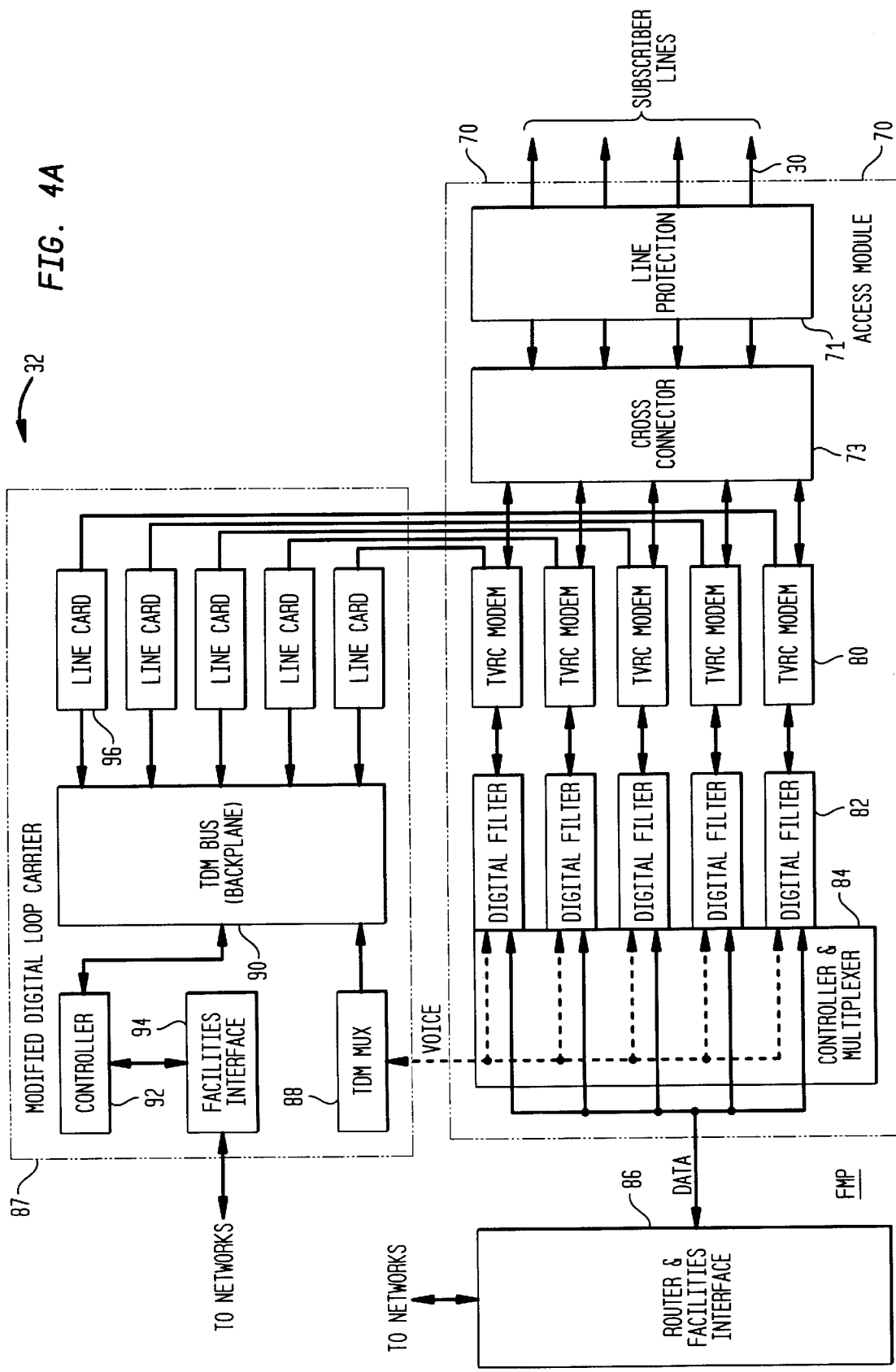
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
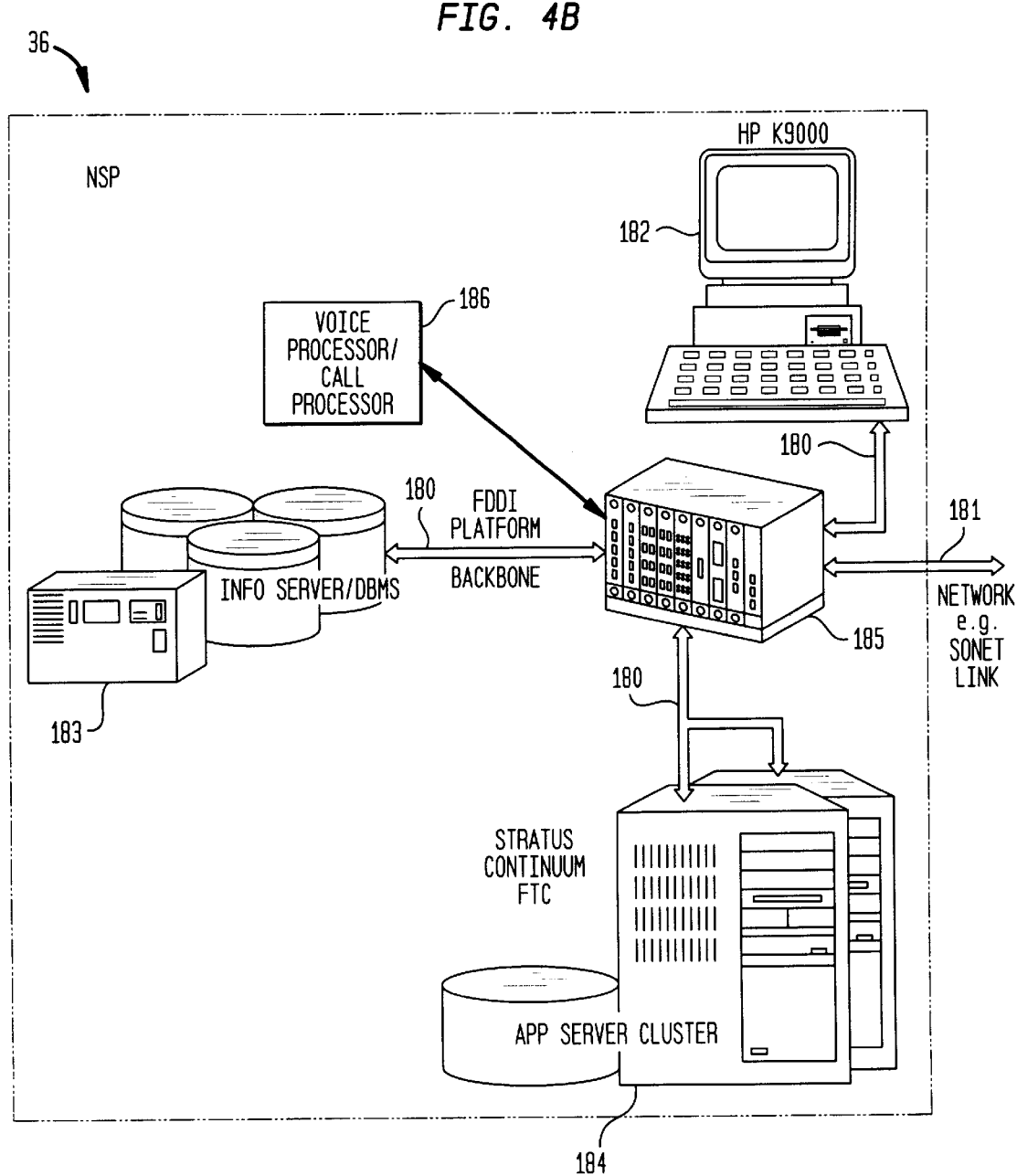
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

Figure 5:
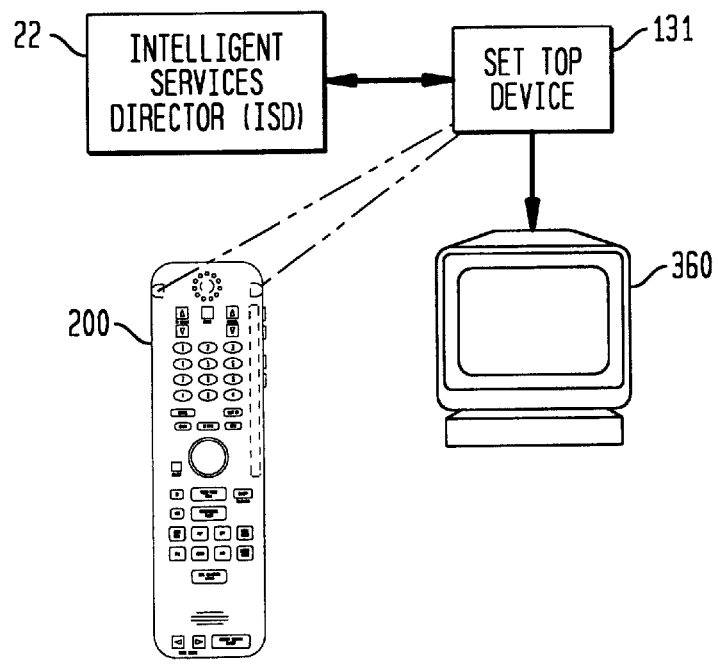
FIG. 5 illustrates a schematic diagram of an integrated remote control and phone system according to an embodiment of the invention.

FIGS. 5–10 depict an integrated remote control and phone according to an embodiment of the present invention. Referring to FIG. 5, the ISD interfaces with a set-top device 131, which is typically is a controller for a television set on which it sits. Remote control handset 200 communicates with a television set-top device 13 in a manner that will be described below. It will be recognized that set-top device 131 could be a modified cable television tuner/descrambler and could be located next to the television set. It will also be recognized that set-top device 131 could control other video appliances, such as a VCR; or be incorporated into the video appliance which it controls.

Referring in addition to FIGS. 6 and 7, handset 200 has a case 202 which houses the electronics that enable the handset to communicate with set-top device 131 via infrared (IR) and/or radio frequency (RF) links in a manner that will be described herein. Case 202 has a front face 204, a rear face 206, a top end 208, a bottom end 210, a left side 212, and a right side 214.

Front face 204 has a user interface comprising control keys for activating various functions. For example, front face 204 has a standard alphanumeric telephone keypad 216 and ancillary cordless telephone function keys, such as REDIAL, AUTO DIAL, FLASH, HOLD and telephone ON/OFF keys. The alphanumeric keypad 216 also controls video/audio functions in conjunction with ancillary video/audio function keys, such as POWER, volume (VOL↕), channel (CH↕), last channel swap (LAST CH), and TV MUTE. Other keys select the device to be controlled, such as TV, VCR, and DVD. Additional keys (MENU, ENTER/RECALL, REMOTE VIDEO, AUDIO, LOCAL VIDEO, PIP, OFF) activate certain on-screen programming, adjustment and control functions for telephone usage, video viewing, etc. Also on front face 204 are openings for a microphone 218 and a loudspeaker 220 which enable the handset to function as a telephone with the loudspeaker held to the user's ear and the microphone adjacent the user's mouth. The weight of the handset preferably is more or less evenly distributed so that it feels balanced and is comfortable to hold when used as a telephone or as a remote control.

Several of the keys on the handset provide, in conjunction with appropriate software, unique control of the incoming and outgoing (local) video components of a telephone call. For example, the VIDEOPHONE MENU key 310 may display on the video appliance 360 (FIG. 5) any of the videophone menus described in the applications incorporated by reference herein. In place of the disclosed touch screen, the present invention contemplates the use of a track ball 311 or other screen navigation device in conjunction with SELECT key 312 to point to and activate various virtual "buttons" that are displayed on the screen to form a graphical user interface. Phone services accessed by the phone menus may include caller ID, speed dials, etc. The REMOTE VIDEO key 300 displays/removes the remote caller's video image on the television screen, while the LOCAL VIDEO key 301 displays/removes the local caller's video image on the television screen Further, picture-in-picture or PIP keys 302, 303 for the remote and local video images enable the local caller to view himself, the remote caller or both, or even display one or both callers along with video programming from another source such as the set-top device 131. An OFF key 304 electronically disables and/or mechanically shutters the local caller's video camera (which may be located, e.g., on top of the television set) so that the local caller can decide whether he should be seen by the remote caller. A DIAL ON-SCREEN NUMBER button is provided for expeditiously dialing a number displayed during an advertisement or possibly through an on-screen directory service. In accordance with the invention, a HANDSET SPEAKER ON/OFF button 350 is provided for quick deactivation and activation of the handset speaker and overlay of the voice call audio signal on the video signal sent to the video appliance via set-top device 131.

In accordance with one aspect of the power-saving features of the invention, the AUDIO key 305 is associated with the remote caller and allows the local caller to direct the audio portion of the remote caller's signal either to the handset loudspeaker 220 or to the speaker system of the video appliance 360 for amplification and broadcast over the television speaker or remote speakers. Where the audio is broadcast over the television speaker, the phone audio volume may be controlled via phone volume controls 306. Thus, the phone audio may be overlayed over the TV audio output with the relative volume or muting of each controlled separately. By using the TV loudspeakers instead of the speaker in the remote control, the battery life in the remote control is conserved. For enhanced ergonomic function, the TV volume control 307 and the phone volume control 306 may be located on the side of the phone (FIG. 8) to allow adjustment of the relative volume of the TV and/or phone audio while talking on the phone. Where surround sound is available, the audio from the phone could be made to come from a different location such as behind the viewer whereas video sound is in front of viewer. Alternatively, the handset may be provided with a controller which will automatically mute or lower the volume of the TV when an incoming call is received or answered.

During use as a telephone, voice and DTMF tone communication through set-top device 131 and/or ISD 22 may be accomplished via a radio frequency link, preferably at a frequency of 900 MHZ., by means of an antenna 132 on set-top device 131 and/or cordless interface 123 on the ISD 22, and an antenna 222 which may be completely concealed within case 202. Antenna 222 is located along one side of case 202, and the electronic components within the case are appropriately shielded by a metal clam-shell structure (not shown) to prevent unwanted interference from the radio frequency transmissions. Although it is preferred to completely conceal antenna 222 within case 202, a partially concealed antenna, or an external antenna, could be used instead. Where an external antenna is used, it is desirable to have multiple infrared diode (IRD) ports to prevent the external antenna from interfering with a single IRD port.

While all communication functions could be effected via the radio frequency link or an infrared link, it is preferred that audio/video control and commands be communicated through the infrared link while audio communications and/ or commands are carried out via the antenna. Set-top device 131 has an infrared detector 133 on the front of its base which receives infrared signals from any of four infrared emitting diodes 224, 226, 228 on handset 200. These diodes preferably have broad beams and together afford maximum infrared coverage for a hand-held remote control device. The diodes may be located on one, two, three, or four faces at and near the top end of case 202 so they will not be rendered inoperative by being covered by the user's hand, which normally engages the lower half of the handset, or as the user turns.

Conventionally located on the top end 208 of case 202 is an infrared emitting diode 224. When the top of handset 200 is aimed generally at set-top device 131, infrared signals emitted by diode 224 are received by detector 133.

For added versatility and convenience, an infrared emitting diode 226 is located on each side of case 202. Signals emitted by one of these side-mounted diodes are received by detector 133 when the user holds the handset with one side generally facing the set-top device 131, such as when the user is holding the handset to his ear during a telephone conversation, generally facing the television set where the remote caller's video signal may be displayed, and wishes to adjust a video function. Having a diode on each side of the handset insures infrared communication regardless of which ear is placed adjacent loudspeaker 220. Thus, volume may be adjusted while the user speaks on the phone. One of the side-mounted diodes 226 also may come into play when the handset is held more or less horizontal but the user turns away from the television set while depressing a command key.

Further, an additional infrared emitting diode 228 is located on the rear face 206 of case 202. Signals from this rear-mounted diode are received when the rear of the handset is held generally facing the set-top device 131. This would occur when the user turns his head away from the television set while holding the handset to his ear. It also allows the handset to function when it is held up by the user for easy viewing of the controls on the front face 204.

Handset 200 preferably is powered by a rechargeable battery or power supply 404 (FIG. 8). The battery may be recharged when the handset is not in use by placing it in a mating recharging cradle in set-top device 131 and including a pair of hot contacts which mate with contacts on case 202. Conventional circuitry in set-top device 131 prevents overcharging of the battery. If the set-top device is integrated into the video appliance which it controls, such as a video receiver, a similar recharging cradle could be provided on the top or the side of the appliance housing. Alternatively, or in addition, a remote recharging cradle powered by line current could provide a more convenient charging location for the handset when not in use.

Although handset 200 is illustrated as generally flat and rectangular in shape, it may take any form as long as it is convenient and comfortable to use as described. The handset could, for example, be ergonomically contoured to more closely fit the hand and the side of the head, e.g. with a curved dumbell face.

Referring now to FIGS. 8A–C and 9, graphic interface screens 800 and 900 are stored in a memory of set-top device 131 which also contains a set-top controller adapted to display those screens and other information on the video appliance 360. The electronic architecture of the set-top device 131 and handset 200 are described in detail in application entitled "Integrated Remote Control and Phone", No. Gerszberg 67-28-16-8 which is incorporated by reference herein.

Figure 8A:
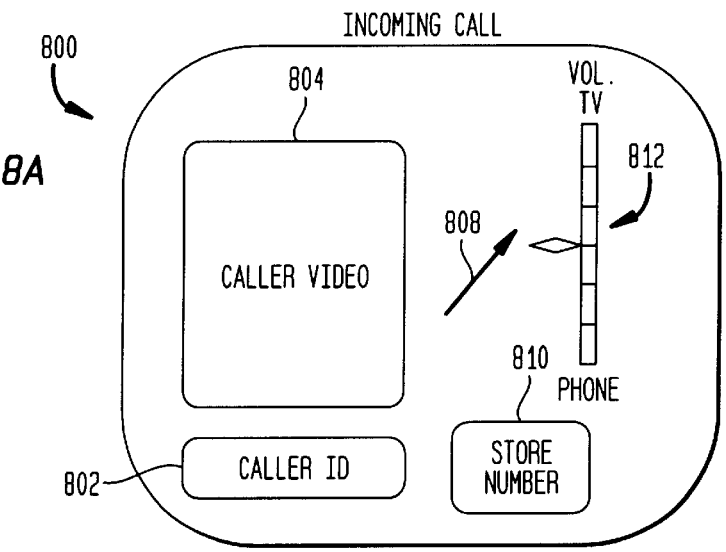
FIGS. 8A–8C illustrate video interface screens for an incoming call, an outgoing call and an advertisement interface, respectively.

FIG. 8A represents a screen 800 associated with an incoming call. Screen 800 may be represented in a window, as a picture-in-picture along with the video broadcast program on video appliance 360, or may be a full-screen, depending on user activation of PIP button 303 (FIG. 6). On screen 800, a caller video window 804 is provided for depicting a video image of the person making the call. Below, a caller ID window 802 displays the phone number of the caller. Interactive button 810, which may be selected by a user moving pointing icon 808 using track ball 311 on the handset 200, permits quick storage of the caller's phone number. The display is additionally provided with an interactive volume display 812 which allows the user to adjust the volume of both the television and the phone using track ball 311. Volume display 812 also reflects changes in volume initiated via handset volume controls 306 and 307.

Figure 8B:
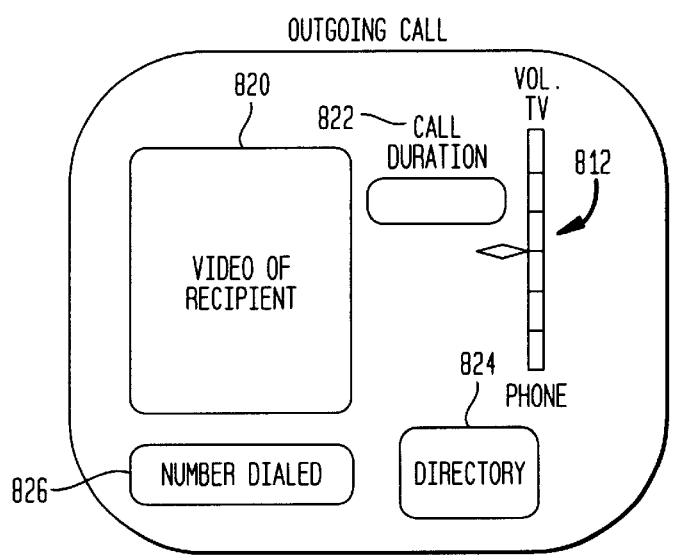

FIG. 8B depicts a screeen associated with an outgoing call, again the screen can be brought up in full or as a picture-in-picture using handset control button 304. The video of the recipient 820 is displayed in video window 820. The number dialed 826 is displayed for the user to view and may be retrieved from a stored directory using interactive button 824. A call duration window 822 displays the length of time of the call.

Figure 8C:
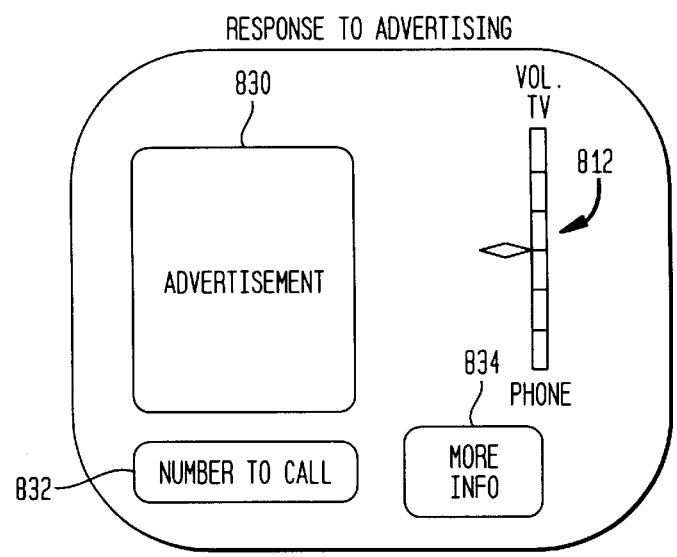

FIG. 8C depicts a screen associated with an advertisement that may be broadcast over the network described above. The advertisement video appears in window 830. The size of screen 830 may be adjusted using the remote video PIP button 303 on handset 200. The number for purchasing the advertised product or service or for obtaining more information about the advertised product or service is displayed in window 832. In accordance with the invention, a hot-key, DIAL ON-SCREEN NUMBER, is provided on handset 352 for enabling a user to impulsively dial the displayed number without stopping to memorize or write down the displayed number. A MORE INFO interactive button is provided on screen 830 for permitting a user to obtain more information, which may be cached on the network in association with the particular advertisement.

Figure 9:
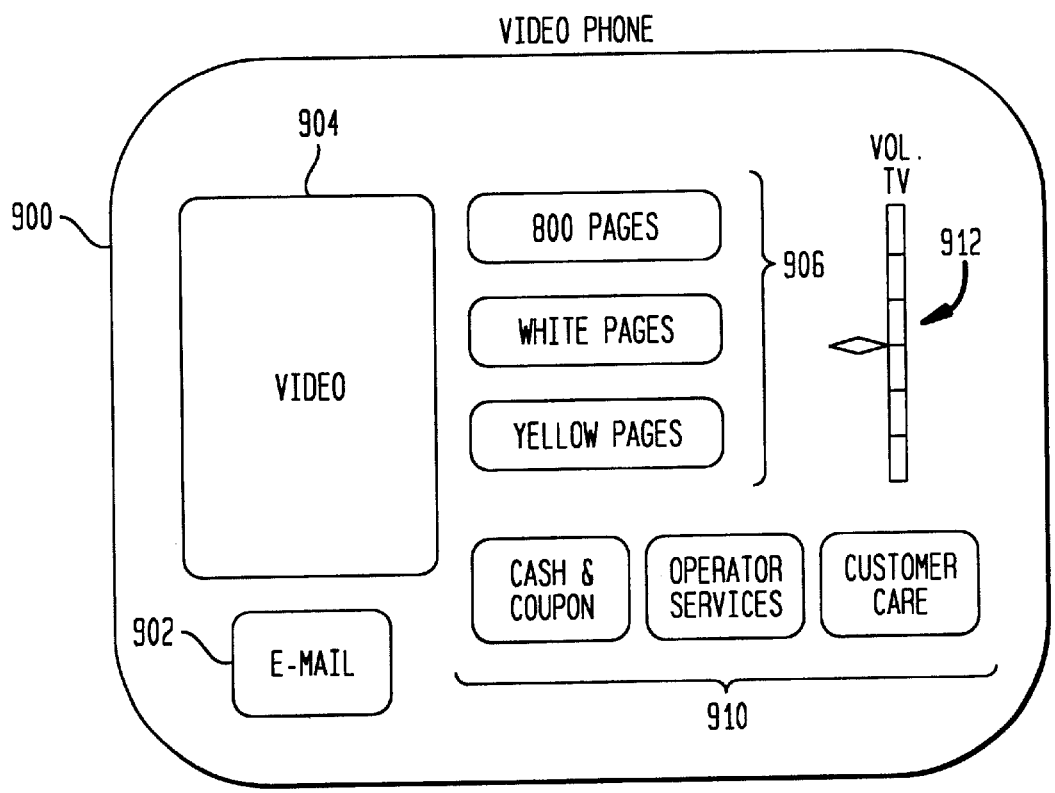
FIG. 9 illustrates a video interface screen that mimics a touch screen for a video phone.

Referring to FIG. 9, the present invention provides a virtual implementation of the touch screen interface of the video phone described in the applications incorporated herein by reference. By depressing VIDEOPHONE MENU button 310, the user can bring up a video image 900 of the video phone on the television screen 360. The trackball 311 or another pointing device is used to interact with the graphic interface and select various virtual "buttons". For example, directory service buttons 906 are represented. An E-MAIL button 902 is also provided. Similarly, customer, operator and coupon service buttons 910 are provided. As is explained in more detail in the related applications listed herein, each button leads to a series of other interactive screens for providing full use to the user of all available network services. Video window 904 is provided to display advertisements or incoming call data in the same manner that it is represented on the video phone touch screen.

The following applications, filed concurrently herewith, are hereby incorporated by reference, except of course, application numbered 37 below which is the present application:

1. A Hybrid Fiber Twisted-pair Local Loop Network Service Architecture (Gerszberg 41-3-13);
2. Dynamic Bandwidth Allocation for use in the Hybrid Fiber Twisted-pair Local Loop Network Service Architecture (Gerszberg 42-4-14);
3. The VideoPhone (Gerszberg 43-9-2);
4. VideoPhone Privacy Activator (Gerszberg 44-10-3);
5. VideoPhone Form Factor (Gerszberg 45-11-4);
6. VideoPhone Centrally Controlled User Interface With User Selectable Options (Gerszberg 46-12-5);
7. VideoPhone User Interface Having Multiple Menu Hierarchies (Gerszberg 47-13-6);
8. VideoPhone Blocker (Gerszberg 79-38-26);
9. VideoPhone Inter-com For Extension Phones (Gerszberg 48-14-7);
10. Advertising Screen Saver (53-17);
11. VideoPhone FlexiView Advertising (Gerszberg 49-15-8);
12. VideoPhone Multimedia Announcement Answering Machine (Gerszberg 73-32-20);
13. VideoPhone Multimedia Announcement Message Toolkit (Gerszberg 74-33-21);
14. VideoPhone Multimedia Video Message Reception (Gerszberg 75-34-22);
15. VideoPhone Multimedia Interactive Corporate Menu Answering Machine Announcement (Gerszberg 76-35-23);
16. VideoPhone Multimedia Interactive On-Hold Information Menus (Gerszberg 77-36-24);
17. VideoPhone Advertisement When Calling Video Non-enabled VideoPhone Users (Gerszberg 78-37-25);
18. Motion Detection Advertising (Gerszberg 54-18-10);
19. Interactive Commercials (Gerszberg 55-19);
20. VideoPhone Electronic Catalogue Service (Gerszberg 50-16-9);
21. A Facilities Management Platform For Hybrid Fiber Twisted-pair Local Loop Network, Service Architecture (Barzegar 18-56-17);
22. Multiple Service Access on Single Twisted-pair (Barzegar (16-51-15);
23. Life Line Support for Multiple Service Access on Single Twisted-pair (Barzegar 17-52-16);
24. A Network Server Platform (NSP) For a Hybrid Fiber Twisted-pair (HFTP) Local Loop Network Service Architecture (Gerszberg 57-4-2-2-4);
25. A Communication Server Apparatus For Interactive Commercial Service (Gerszberg 58-20-11);
26. NSP Multicast, PPV Server (Gerszberg 59-21-12);
27. NSP Internet, JAVA Server and VideoPhone Application Server (Gerszberg 60-5-3-22-18);
28. NSP WAN Interconnectivity Services for Corporate Telecommuters (Gerszberg 71-9-7-4-21-6);
29. NSP Telephone Directory White-Yellow Page Services (Gerszberg 61-6-4-23-19);
30. NSP Integrated Billing System For NSP services and Telephone services (Gerszberg 62-7-5-24-20);
31. Network Server Platform / Facility Management Platform Caching Server (Gerszberg 63-8-6-3-5);
32. An Integrated Services Director (ISD) For HFTP Local Loop Network Service Architecture (Gerszberg 72-36-22-12);
33. ISD and VideoPhone Customer Premise Network (Gerszberg 64-25-34-13-5);
34. ISD Wireless Network (Gerszberg 65-26-35-14-6);
35. ISD Controlled Set-Top Box (Gerszberg 66-27-15-7);
36. Integrated Remote Control and Phone (Gerszberg 67-28-16-8);
37. Integrated Remote Control and Phone User Interface (Gerszberg 68-29-17-9);
38. Integrated Remote Control and Phone Form Factor (Gerszberg 69-30-18-10);
39. VideoPhone Mail Machine (Attorney Docket No. 3493.73170);
40. Restaurant Ordering Via VideoPhone (Attorney Docket No. 3493.73171);
41. Ticket Ordering Via VideoPhone (Attorney Docket No. 3493.73712);
42. Multi-Channel Parallel/Serial Concatenated Convolutional Codes And Trellis Coded Modulation Encode/Decoder (Gelblum 4-3);
43. Spread Spectrum Bit Allocation Algorithm (Shively 19-2);
44. Digital Channelizer With Arbitrary Output Frequency (Helms 5-3);
45. Method And Apparatus For Allocating Data Via Discrete Multiple Tones (filed Dec. 22, 1997, Attorney Docket No. 3493.20096—Sankaranarayanan 1-1);
46. Method And Apparatus For Reducing Near-End Cross Talk In Discrete Multi-Tone Modulators/Demodulators (filed Dec. 22, 1997, Attorney Docket No. 3493.37219—Helms 4-32-18).

In addition, the following two patent applications are hereby incorporated by reference:

1. U.S. patent application Ser. No. 08/943,312 filed Oct. 14, 1997, entitled Wideband Communication System for the Home, to Robert R. Miller, II and Jesse E. Russell, and
2. U.S. patent application Ser. No. 08/858,170, filed May 14, 1997, entitled Wide Band Transmission Through Wire, to Robert R. Miller, II, Jesse E. Russell and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. In a broadband local area communication network interconnecting a plurality of devices for handling analog and/or digital voice and/or data, including a video set-top device adapted to control a composite video signal feed to a video appliance including a video appliance speaker, an energy efficient user interface for permitting a user to remotely access audio, video and telephonic services, the interface comprising:

a set-top controller for generating a plurality of predetermined video screens on the video appliance;

a handset for providing telephonic communication to the user and for communicating with the video set-top device, the handset including a handset speaker and power-saving means for conveying a signal representing the audio portion of the telephonic communication to the video set-top device such that the audio portion of the telephonic communication may be overlayed on an audio portion of the video signal feed; and a control panel comprising a plurality of user-engageable controls on the handset for permitting the user to communicate with the set-top controller, wherein the control panel includes separate volume controls for controlling a volume of the audio portion of the telephonic communication for the handset speaker and for controlling a volume of the audio portion of the video signal feed for the video set-top device, wherein the set-top controller is adapted to display an advertisement selectively filtered in accordance with a specific customer user's preferences broadcast to the set-top box and wherein the control panel is provided with a control permitting the user to dial a number displayed in the advertisement.

2. An interface according to claim 1, wherein the control panel includes a remote video control permitting a user to activate or deactivate an on-screen video image of a caller and wherein the set-top device controller is adapted to display the on-screen video image of the caller responsive to the remote video control.

3. An interface according to claim 1, further comprising a local video camera for generating a local video image and providing the local video image to the video controller, wherein the control panel includes a local video control permitting a user to activate or deactivate the local video image and wherein the set-top device controller is adapted to display the local video image responsive to the local video control.

4. An interface according to claim 1, wherein the handset is provided with a controller that automatically lowers the volume of the audio portion of the video signal feed based on the presence of the telephonic communication.

5. An interface according to claim 1, wherein the set-top controller is adapted to display a graphical representation of the video appliance speaker volume and the handset speaker volume.

6. An interface according to claim 1, wherein the control panel includes a track ball for permitting the user to move a pointer represented on the video appliance.

7. An interface according to claim 6, wherein the set-top controller is adapted to display images corresponding to particular commands and wherein the trackball is used to select the commands.

8. An interface according to claim 1, wherein the set-top controller is adapted to display the phone number of the caller.

9. An interface according to claim 8, wherein the set-top controller is adapted to display a user-selectable command for storing the phone number.

10. An interface according to claim 1, wherein the set-top controller is adapted to display a phone number dialed by the user.

11. An interface according to claim 1, wherein the set-top controller is adapted to display a rendition of a touch screen for a video phone.

12. In a broadband local area communication network interconnecting a plurality of devices for handling analog and/or digital voice and/or data, including a video set-top device adapted to control a composite video signal feed to a video appliance including a video appliance speaker, an energy efficient user interface for permitting a user to remotely access audio, video and telephonic services, the energy efficient user interface comprising:

a set-top controller for generating a plurality of predetermined video screens on the video appliance, wherein the set-top controller is adapted to display a phone number of an incoming call and a user-selectable command for storing the phone number;

a handset for providing telephonic communication to the user and for communicating with the video set-top device, the handset including a handset speaker and power-saving means for conveying a signal representing the audio portion of the telephonic communication to the video set-top device such that the audio portion of the telephonic communication may be overlayed on an audio portion of the video signal feed;

a control panel comprising a plurality of user-engageable controls on the handset for permitting the user to communicate with the set-top controller, wherein the control panel includes controls for storing the phone number of an incoming call and wherein the control panel includes separate volume controls for controlling a volume of the audio portion of the telephonic communication for the handset speaker and for controlling a volume of the audio portion of the video signal feed for the video set-top device, wherein the set-top controller is adapted to display an advertisement broadcast selectively filtered in accordance with a specific customer user's preferences to the set-top box and wherein the control panel is provided with a control permitting the user to dial a number displayed in the advertisement.

13. An interface according to claim 12, wherein the control panel includes a remote video control permitting a user to activate or deactivate an on-screen video image of a caller and wherein the set-top device controller is adapted to display the on-screen video image of the caller responsive to the remote video control.

14. An interface according to claim 12, further comprising a local video camera for generating a local video image and providing the local video image to the video controller, wherein the control panel includes a local video control permitting a user to activate or deactivate the local video image and wherein the set-top device is adapted to display the local video image responsive to the local video control.

15. An interface according to claim 12, wherein the set-top controller is adapted to display images corresponding to particular commands, and the control panel includes a trackball for selecting the commands.

16. In a broadband local area communication network interconnecting a plurality of devices for handling analog and/or digital voice and/or data, including a video set-top device adapted to control a composite video signal feed to a video appliance including a video appliance speaker, an energy efficient user interface for permitting a user to remotely access audio, video and telephonic services, the energy efficient user interface comprising:

a set-top controller for generating a plurality of predetermined video screens on the video appliance, wherein the set-top controller is adapted to display an advertisement, selectively filtered in accordance with a user's preferences, broadcast to the set-top box and wherein the control panel is provided with a control permitting the user to dial a number displayed in the advertisement;

a handset for providing telephonic communication to the user and for communicating with the video set-top device, the handset including a handset speaker and power-saving means for conveying a signal representing the audio portion of the telephonic communication to the video set-top device such that the audio portion of the telephonic communication may be overlayed on an audio portion of the video signal feed;

a control panel comprising a plurality of user-engageable controls on the handset for permitting the user to communicate with the set-top controller, wherein the control panel includes separate volume controls for controlling a volume of the audio portion of the telephonic communication for the handset speaker and for controlling a volume of the audio portion of the video signal feed for the video set-top device.

17. An interface according to claim 16, wherein the control panel includes a remote video control permitting a user to activate or deactivate an on-screen video image of a caller and wherein the set-top device controller is adapted to display the on-screen video image of the caller responsive to the remote video control.

18. An interface according to claim 16, further comprising a local video camera for generating a local video image and providing the local video image to the video controller, wherein the control panel includes a local video control permitting a user to activate or deactivate the local video image and wherein the set-top device is adapted to display the local video image responsive to the local video control.

* * * * *